United States Patent [19]
Greif

[11] Patent Number: 4,800,361
[45] Date of Patent: Jan. 24, 1989

[54] ANTI-THEFT ALARM SYSTEM FOR MOTOR VEHICLES

[76] Inventor: Jonathan D. Greif, 67 Center St., Clinton, N.J. 08809

[21] Appl. No.: 73,064

[22] Filed: Jul. 13, 1987

[51] Int. Cl.$^4$ ............................................. B60R 25/00
[52] U.S. Cl. ...................................... 340/63; 340/541; 250/221
[58] Field of Search ................. 340/555, 63, 541, 573; 250/221

[56] References Cited

U.S. PATENT DOCUMENTS

| | | | |
|---|---|---|---|
| 3,549,892 | 12/1970 | Perlman | 340/555 X |
| 3,745,550 | 7/1973 | Anthony et al. | 340/328 |
| 4,302,747 | 11/1981 | Belmuth | 340/63 X |
| 4,563,673 | 1/1986 | Fechner | 340/568 |
| 4,612,535 | 9/1986 | Sequin et al. | 340/539 |
| 4,614,939 | 9/1986 | Wang | 340/568 |
| 4,638,293 | 1/1987 | Min | 340/693 X |

FOREIGN PATENT DOCUMENTS 2557334 3/1983 France ................................ 340/567

OTHER PUBLICATIONS

"Photocell Property Protector", by D. Snalth, *Radio and Electronics Constructor*, 8/1978, pp. 724-726, vol. 31, No. 12.

*Primary Examiner*—Charles A. Ruehl
*Assistant Examiner*—Jeffery A. Hofsass
*Attorney, Agent, or Firm*—Kenneth P. Glynn

[57] ABSTRACT

The primary object of the present invention is to provide an alarm system which is capable of being set off prior to any damage being done to the motor vehicle by an intruder. Thus, an intruder who merely shines a flashlight into the dashboard area of the vehicle to determine whether or not there is a radio, stereo, or other valuable item to be taken, will set off the present invention alarm system prior to actually breaking into the vehicle. Thus, the present invention is directed to a motor vehicle alarm system which is designed to respond to the intrusion of light and which incldues a physical enclosure for placement in the inside area of a motor vehicle which has a faceplate with at least one aperture through which intruding light may enter, as well as an intruding light detecting means within the enclosure which is located at the aperture. A signal generating means is connected to the intruding light detecting means so as to generate a signal in respose to a preset level of intruding light. A signal transmitting means which is connected to the signal generating means transmits a signal to set off an alarm. The signal may be transmitted through a wire to an alarm located in the vehicle or it may be transmitted by radio to a radio receiver which is either in the vehicle or at a remote location and which triggers the alarm. Preferably, the intruding light detecting means is a photosensor which is responsive to normal flashlight levels of visible light radiation.

12 Claims, 3 Drawing Sheets

ANTI-THEFT ALARM SYSTEM FOR MOTOR VEHICLES

BACKGROUND OF THE INVENTION

1. Field of the Invention

The present invention is directed to alarm systems for motor vehicles which are placed within the cab area of the vehicle so as to set off an alarm to warn of imminent intrusion. More specifically, the present invention is directed to a motor vehicle alarm system which is responsive to the intrusion of light and particularly to the shining of a flashlight, e.g. of a thief, into the dashboard area of a motor vehicle such as occurs when a thief is examining a vehicle prior to entry to determine whether or not there is a valuable, accessible stereo system, radar detector or the like.

2. Prior Art Statement

The prior art is replete with patent references which show various types of alarm systems to warn of intrusion by thieves of motor vehicles or thieves who intend to take components from inside the motor vehicles. Most of these alarms involve responsive detection of tampering, vibrations or removal or opening of windows, doors, hoods, trunks or the like. Typical of these prior art references are U.S. Pat. Nos. 3,986,166 which is issued to Michel Kohn; 4,052,716 issued to Tage Mortensen; and, 4,638,293 issued to Byung-Woo Min. These three patents span the past decade or so and are typical of the state of the art.

U.S. Pat. No. 3,986,166 is directed to an alarm system for automobiles which is actuated when an unauthorized person tampers with the automobile. In this particular invention, an inductive coupling is made with the automobile electrical system so that a variation in current flow in the system activates the alarm. Provision is made for the operator to turn on and off the system.

U.S. Pat. No. 4,052,716 is directed to a device for monitoring an area under surveillance for detecting the existence of a fire, the presence of an intruder or the occurrence of other abnormal conditions, as well as a warning signal for actuating an alarm in response thereto. The particular device employs a plurality of sensors which respond by changes in the electrical characteristics thereof to the level of infrared, light or other radiations from the monitored space respectively sensed thereby. In other words, the device reacts to interference by smoke, fire or an intruder and sets off an alarm. An elaborate electrical schematic diagram is shown which involves various types of sensors to signal alarms in response to predetermined conditions.

U.S. Pat. No. 4,638,293 issued on Jan. 20, 1987 is directed to an alarm system for an automobile comprising an alarm circuit chip which is built into the car stereo housing and interfaced with the stereo circuitry. In this invention, the alarm system is controlled and programmed by the same selector buttons and controls which are used in conjunction with the car stereo and radio. Some of the sensors for the alarm system are disposed in conventional circuit portions of the car, such as the door, hood and trunk light circuits.

Some prior art systems focus specifically on methods and apparatus for detecting changes in lighting intensity utilizing a microprocessor, as set forth in U.S. Pat. No. 4,460,892 and photosensitive alarm systems as set forth in U.S. Pat. No. 4,242,670. These patents show specific variations on the concept of measuring and electronically reacting to light changes so as to set off an alarm signal.

While all of the above cited patents are exemplary of the prior art relating to automobile alarm systems or to the prior art of alarm systems in general, it should be noted that none of these references describe or suggest the present invention alarm system which is adapted to respond to the intrusion of light. Although U.S. Pat. No. 4,638,293 issued only months prior to this application, and many types of alarm systems are described therein, there is no indication of any system which would be responsive to the intrusion of flashlight or other lighting by a potential thief. Thus, the particularly advantageous system of signalling an alarm before a potential intruder physically breaks a window or door lock is not set forth in the prior art whereas it is the essential feature of the present invention.

SUMMARY OF THE INVENTION

The primary object of the present invention is to provide an alarm system which is capable of being set off prior to any damage being done to the motor vehicle by an intruder. Thus, an intruder who merely shines a flashlight into the dashboard area of the vehicle to determine whether or not there is a radio, stereo, or other valuable item to be taken, will set off the present invention alarm system prior to actually breaking into the vehicle. Thus, the present invention is directed to a motor vehicle alarm system which is designed to respond to the intrusion of light and which includes a physical enclosure for placement in the inside area of a motor vehicle which has a faceplate with at least one aperture through which intruding light may enter, as well as an intruding light detecting means within the enclosure which is located at the aperture. A signal generating means is connected to the intruding light detecting means so as to generate a signal in response to a preset level of intruding light. A signal transmitting means which is connected to the signal generating means transmits a signal to set off an alarm. The signal may be transmitted through a wire to an alarm located in the vehicle or it may be transmitted by radio to an alarm which is either in the vehicle or at a remote location. Preferably, the intruding light detecting means is a photosensor which is responsive to normal flashlight levels of visible light radiation.

BRIEF DESCRIPTION OF THE DRAWINGS

The present invention is more fully appreciated when taken in conjunction with the drawings herein. The following drawings are included.

DETAILED DESCRIPTION OF THE PRESENT INVENTION

Figure 1:
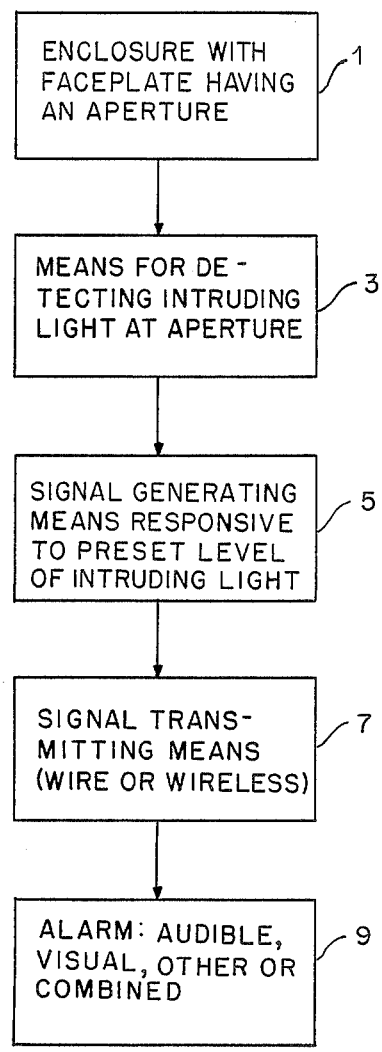
FIG. 1 is a block diagram illustrating the concept of the present invention.

Referring now to FIG. 1, there is shown an enclosure 1 with a faceplate having an aperture and means for detecting intruding light 3 which is located at the aperture of enclosure 1. The means for detecting intruding light 3 is connected to a signal generating means 5 which is responsive to a preset level of intruding light and this in turn is connected to signal transmitting means 7 which may be wire or wirelessly connected to alarm 9. As shown, the alarm may be audible, visual, or some other alarm mechanism or a combination of any of the known alarm mechanisms. While enclosure 1 has at least a faceplate having an aperture, it should be noted that the enclosure is designed for placement inside the motor vehicle, that is in the cab area where there are seats and a dashboard and is designed to be mountable therein by way of a frame. The enclosure 1 has a faceplate which, by necessity, has an aperture for receiving the intruding light and this light will be detected by an intruding light detecting means within the enclosure, as indicated. While any known means for detecting intruding light may be used, details are set forth as described in conjunction with FIGS. 3 and 4. The signal generating means 5 is likewise one which is now conventionally known in the electronics industry as is the signal transmitting means.

Thus, in the broadest sense, the present invention is directed to a motor vehicle alarm system which is adapted to respond to intrusion of light and which comprises an enclosure for placement in the inside area of a motor vehicle which enclosure has at least a frame and a faceplate with the faceplate having at least one aperture through which intruding light may enter. There is an intruding light detecting means within the enclosure and located at the aperture as well as a signal generating means connected to the intruding light detecting means which is adapted to generate a signal in response to a preset level of intruding light. A signal transmitting means is connected to the signal generating means for transmission of a generated signal to set off an alarm and an alarm is included which is adapted to receive a signal transmitted from the signal transmitting means so as to set off the alarm signal in response thereto.

Figure 2:
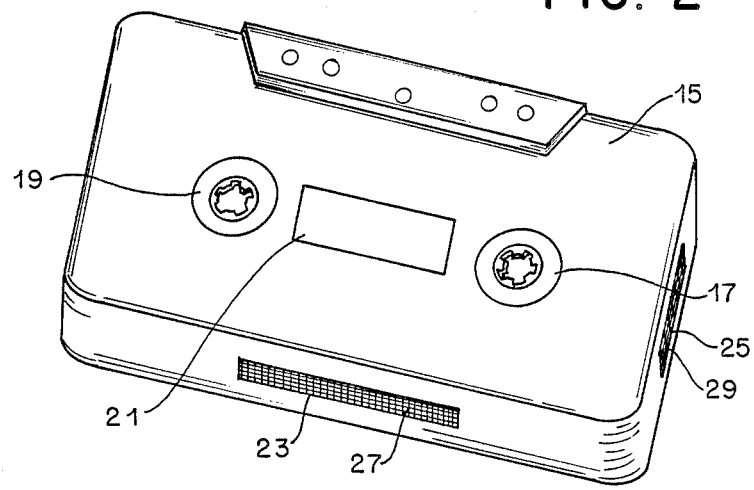
FIG. 2 shows an oblique view of one preferred embodiment of the exterior or enclosure used for a motor vehicle alarm system of the present invention.

Referring now to FIG. 2, there is shown a mock tape cassette 15 having mock reels 17 and 19 and location indicator 21. Contained on the side thereof and on the front thereof, are apertures 23 and 25 with photosensors 27 and 29 located therein. While cassette 15 is shown to have photosensors 27 and 29 on both its front and its side, it could have the aperture and photosensor located either on the side or the front instead of both. One such embodiment would be designed for the types of tape deck systems which receive cassette lengthwise and the other for such system which receive cassettes widthwise. In any event, the particular components in the broadest sense contained within the FIG. 2 cassette 15, would be those set forth diagramatically in FIG. 1 and could be systems such as those specifically shown in FIGS. 3 and 4 below.

Figure 3:
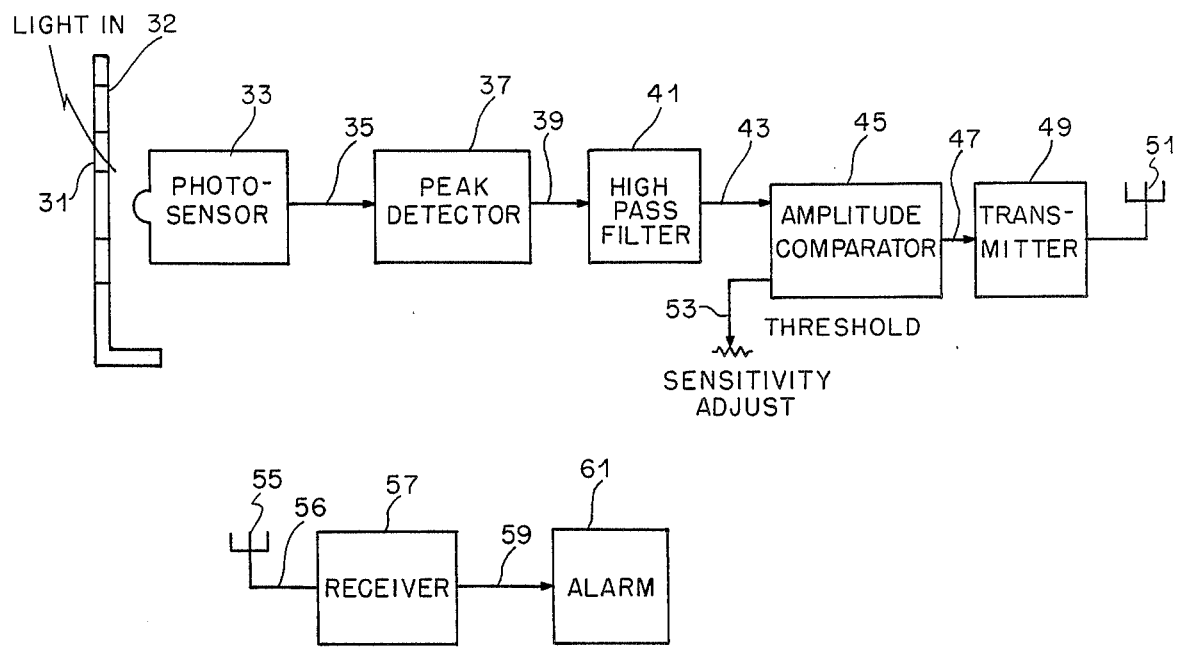
FIG. 3 shows a detailed diagram of the various components of a present invention motor vehicle alarm system wherein radio transmission of a generated signal is utilized.

Referring now to FIG. 3, a specific diagram is shown with detailed aspects for one preferred embodiment of a motor vehicle alarm system of the present invention. As mentioned above, the purpose of the present invention is to provide an alarm before any damage is actually accomplished. The detection may be accomplished by the circuitry shown in FIG. 3. In this embodiment, the items in the top row, 33 through 51, are hidden from casual view and placed in a location likely to be the subject of an intruder's survey. Typically, this circuitry may be enclosed to look like a tape cassette and placed in the tape slot of a stereo player. An intruder would be likely to check for the presence of a stereo player wherein the mock tape cassette is situated before intrusion into an automobile. The items shown in the second row of FIG. 3 would receive the intrusion signal and sound the alarm.

In this embodiment, light enters through an aperture 31 of enclosure 32 so that light entering from an external source would be likely to impinge upon the photosensor 33. Direct light sources, internal to the vehicle may be blocked by the aperture from impinging upon the photosensor 33. The photosensor reacts to the light by producing a voltage output 35 that is fed to a peak detector 37. The peak detector 37 holds the peak value of the voltage received, having a long decay time constant so that sudden decreases in photosensor output, followed by a resumption to the previous level, do not cause changes in the peak detector output 39. The peak detector 37 will react only to increases in input, producing a change in voltage to the high pass filter 41. Thus, photosensor 33, peak detector 37 and high pass filter 41 combine to form intruding light detecting means.

The high pass filter 41 reacts only to rapid changes, such as would occur when a light source is turned on or suddenly focused upon or passed across the photosensor 33. The high pass filter 41 output 43 will consist of a rapid pulse or pulses as a response to its input. This output 43 is fed to an amplitude comparator 45, where it is compared to a threshold 53. The threshold 53 is adjustable to allow for changes in the sensitivity of the instrument. If the high pass filter output 43 exceeds the threshold, then the amplitude comparator 45 produces an output 47 that triggers the transmitter 49. The transmitter 49 is typically a coded radio frequency device that transmits a signal through antenna 51 that is transmitted to a receiving antenna 55 located nearby.

The receiving antenna 55 provides a signal 56 to a receiver 57 that decodes the input signal 56, predetermining if it is from the transmitter 49. If the signal decodes correctly, then an output 59 from the receiver 57 triggers an alarm 61, that acts appropriately to the intrusion. The alarm circuit is triggered each time there is a light input of sufficient intensity and with rapid enough rise in intensity to pass through the detection circuitry. In an alternative embodiment, the peak detector 37 and high pass filter 41 may be excluded, but these are preferred to increase the efficiency and reliability of the system.

Figure 4:
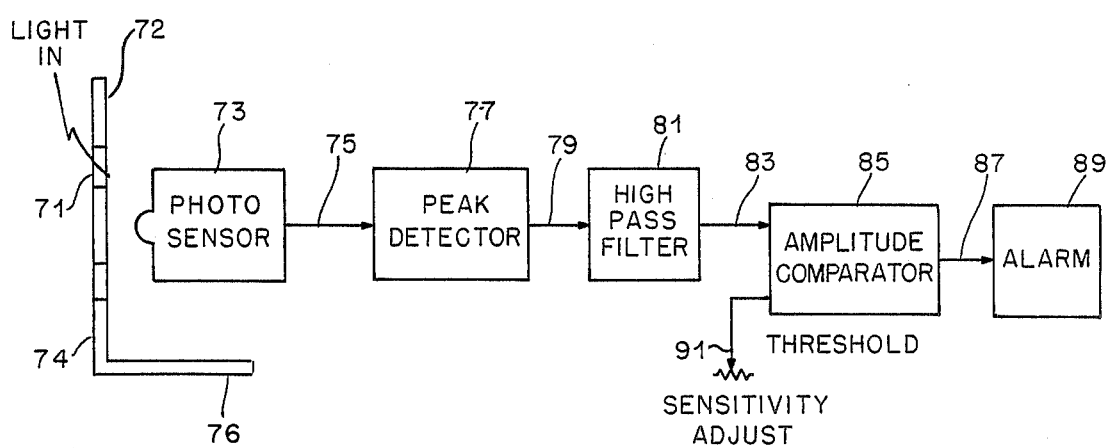
FIG. 4 shows a detailed diagram of an embodiment of the present invention motor vehicle alarm system using direct wire transmission of a signal to an alarm.

FIG. 4 shows an alternative embodiment where the alarm is wired directly to the other aspects of the device. Referring now specifically to FIG. 4, intruding light enters through an aperture 71 of enclosure 72 having faceplate 74 and frame 76 (shown partially). Aperture 71 is located such that light entering from an external source would be likely to impinge upon the photosensor 73. Direct light sources, internal to the premises may be blocked by the aperture from impinging upon the photosensor. The photosensor 73 reacts to the light by producing a voltage output 75 that is fed to a peak detector 77. The peak detector 77 holds the peak value of the voltage received, having a long decay time constant so that sudden decreases in photosensor output 75, followed by a resumption to the previous level, do not cause changes in the peak detector output 79. The peak detector 77 will react only to increases in input, producing a change in voltage to the high pass filter 81.

The high pass filter 81 reacts only to rapid changes, such as would occur when a light source is turned on or suddenly focused upon the photosensor 73. The high pass filter output 83 will consist of a rapid pulse or pulses as a response to its input. This output 83 is fed to an amplitude comparator 85, where it is compared to a threshold 91. The threshold 91 is adjustable to allow for changes in the sensitivity of the instrument. If the high pass filter output 83 exceeds the threshold 91, then the amplitude comparator 85 produces an output 87 that triggers the alarm 89. The alarm circuit then acts appropriately to the intrusion. The alarm circuit is triggered each time there is a light input of sufficient intensity and with rapid enough rise in intensity to pass through the detection circuitry. The alarm itself may be audible, e.g. connected to a horn or siren, or it may be visual, e.g. cycle lights off and on repeatededly, or other known alarm signal or combination of signals.

Figure 5:
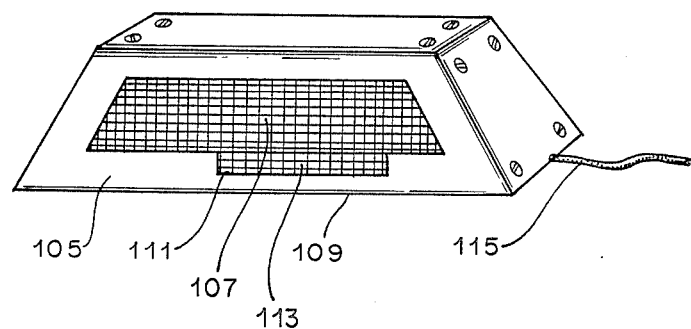
FIG. 5 shows an alternative preferred embodiment of an enclosure used with the motor vehicle alarm system of the present invention involving a speaker; and, FIG. 6 shows another alternative embodiment for the enclosure of the motor vehicle alarm system of the present invention utilizing a digital thermometer display.
Figure 6:
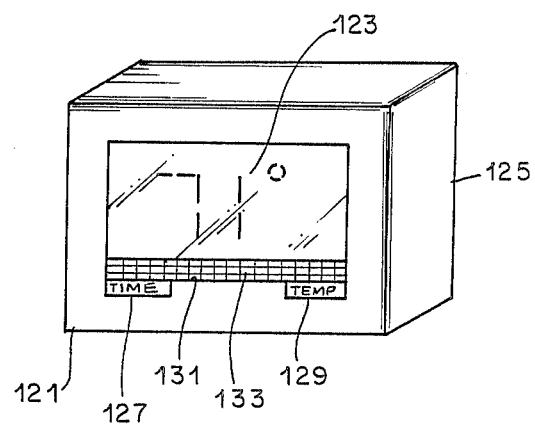

As mentioned earlier, the present invention motor vehicle alarm system could be embodied in whole or in part in a device which appears to be a cassette or tape for a tape deck of an automobile. Additionally, other physical arrangements may be as readily viable. The critical aspect of the design would be to enable the motor vehicle alarm system photosensor of the present invention to be mounted somewhere inside the vehicle such as around, on, in, or below the dashboard area. Thus, FIG. 5 shows speaker 105 which includes speaker screen 107 and includes a base 109 which is mountable on the top of the dashboard. Photosensor 113 is located in aperture 111 immediately below the speaker screen 107. Wire 115 which would appear to go to the radio system could be wired directly to the alarm system. Obviously, this could be mounted, for example, on the dashboard passenger side of the vehicle and may be made on a relatively small scale. Alternatively, FIG. 6 shows what appears to be a digital temperature readout device 121 which includes digital readout display 123 and back surface 125 which may be mountable to the front surface of a dashboard, e.g., by VELCRO ® strip or by adhesive. Time setting 127 and temperature setting 129 may be included along with aperture 131 which contains photosensor 133. The devices shown in FIGS. 5 and 6 could readily embody a motor vehicle alarm system or portion thereof for the present invention and yet would very effectively conceal the system from an intruder. Thus, by embodying the motor vehicle alarm system or portion thereof in different types of enclosures and by including other functionalities for such enclosures, an intruder would not readily know the appearance of such an alarm system and could not easily avoid setting off the alarm while utilizing a flashlight to scrutinize the inside of a vehicle for theft.

Also, as indicated above, the present invention has been developed to trigger an alarm in response to intruding light and it should be re-emphasized that the alarm may be connected to the system by wire or radio or other wireless mechanism. The alarm itself may be an integral part of the product embodying the present invention or the invention may be sold separately and used in conjunction with existing alarms separately installed in the vehicle. Thus, in one embodiment, the present invention does not actually include the alarm but is designed to be operative with a preesisting alarm, while in other embodiments an alarm is included.

Obviously, numerous modifications and variations of the present invention are possible in light of the above teachings. It is therefore understood that within the scope of the appended claims, the invention may be practiced otherwise than as specifically described herein.

What is claimed is:

1. In a motor vehicle alarm system which includes an alarm and which is adapted to signal the alarm in response to attempted intrusion, an improvement which is adapted to respond to intrusion of light into said motor vehicle, which comprises:

(a) an enclosure for placement in the inside area of a motor vehicle having at least a frame and a faceplate, said faceplate having at least one aperture through which intruding light may enter, said enclosure being portably located on a dashboard and having the appearance and size of a tape cassette so as to conceal it from an intruder;
  (b) intruding light detecting means within said enclosure and located at said aperture;
  (c) a signal generating means connected to said intruding light detecting means adapted to generate a signal in response to a preset level of intruding light; and,
  (d) a signal transmitting means connected to said signal generating means for transmission of a generated signal to set off an alarm.

2. The system of claim 1 wherein said intruding light detecting means is a photosensor.

3. The system of claim 1 wherein said light detecting means includes a combination of a photosensor, a peak detector and a high pass filter.

4. The system of claim 1 wherein the signal generating means is an amplitude comparator which only generates a signal after a preset light detection amplitude comparison level is recognized.

5. The system of claim 2 wherein the signal generating means is an amplitude comparator which only generates a signal after a preset light detection amplitude comparison level is recognized.

6. The system of claim 3 wherein said amplitude comparator is preset at permanent setting.

7. The system of claim 3 wherein said amplitude comparator is adjustable so as to be manually preset at a setting of choice.

8. The system of claim 1 wherein said alarm is directly wired to said signal transmitting means.

9. The system of claim 1 wherein said alarm is radio connected to said signal transmitting means and includes a radio receiver and wherein said signal transmitting means is a radio transmitter.

10. The system of claim 9 which further includes an alarm which is located within said motor vehicle.

11. The system of claim 9 which further includes an alarm which is remotely located outside of said motor vehicle.

12. The system of claim 1 wherein said tape cassette and contains said intruding light detecting means, signal generating means and signal transmitting means.

* * * * *